(12) United States Patent
Asbury et al.

(10) Patent No.: US 9,652,701 B2
(45) Date of Patent: May 16, 2017

(54) SYSTEM AND METHOD FOR ROUTING AND SPECIFYING PRINT JOBS UTILIZING PRODUCT CHARACTERISTICS

(71) Applicant: FUJIFILM North America Corporation, Valhalla, NY (US)

(72) Inventors: Christopher T. Asbury, Rochester, NY (US); Timothy F. Crist, Rochester, NY (US); Seymen Ertas, Rochester, NY (US)

( * ) Notice: Subject to any disclaimer, the term of this patent is extended or adjusted under 35 U.S.C. 154(b) by 0 days.

(21) Appl. No.: 15/225,263

(22) Filed: Aug. 1, 2016

(65) Prior Publication Data

US 2016/0342872 A1    Nov. 24, 2016

Related U.S. Application Data

(63) Continuation of application No. 13/628,741, filed on Sep. 27, 2012, now Pat. No. 9,405,489.

(60) Provisional application No. 61/540,393, filed on Sep. 28, 2011.

(51) Int. Cl.
| | |
|---|---|
| *G03G 15/00* | (2006.01) |
| *B41J 29/38* | (2006.01) |
| *G06K 15/00* | (2006.01) |
| *G06F 3/12* | (2006.01) |
| *G06K 15/02* | (2006.01) |

(52) U.S. Cl.
CPC ....... *G06K 15/4065* (2013.01); *G06F 3/1204* (2013.01); *G06F 3/126* (2013.01); *G06F 3/1261* (2013.01); *G06F 3/1282* (2013.01); *G06F 3/1284* (2013.01); *G06F 3/1287* (2013.01); *G06K 15/021* (2013.01); *G06F 3/121* (2013.01)

(58) Field of Classification Search
None
See application file for complete search history.

(56) References Cited

U.S. PATENT DOCUMENTS

| | | | |
|---|---|---|---|
| 6,348,971 | B2 | 2/2002 | Owa et al. |
| 9,405,489 | B2 * | 8/2016 | Asbury ............... G06F 3/1204 |
| 2004/0246511 | A1 | 12/2004 | Wong et al. |
| 2007/0268504 | A1 | 11/2007 | Safer et al. |
| 2009/0266926 | A1 | 10/2009 | Yoshimaru et al. |
| 2010/0007910 | A1 | 1/2010 | Martin et al. |
| 2010/0073705 | A1 | 3/2010 | Cain |
| 2010/0290797 | A1 | 11/2010 | Mestha et al. |

(Continued)

*Primary Examiner* — Daniel J Colilla
*Assistant Examiner* — Ruben Parco, Jr.
(74) *Attorney, Agent, or Firm* — Woods Oviatt Gilman LLP; Dennis B. Danella, Esq.

(57) ABSTRACT

A scoring and weighting system and method for providing print device selection on the basis of product characteristics that are specified for a print product is provided. The system determines the properties of one or more printing devices in relation to the product characteristics. The printing devices have one or more print mediums for providing the print product. A score is derived by determining a status respecting the conformity of the one or more print mediums to the product characteristics and evaluating the one or more printing devices' properties. Associating that score with each of the one or more printing device. Also, associating the print product with a print job and utilizing the score to route the print job to one of the one or more printing devices to produce the print product on one of the one or more print mediums.

33 Claims, 6 Drawing Sheets (56) References Cited

U.S. PATENT DOCUMENTS

2010/0315680 A1 12/2010 Ishikake
2011/0205575 A1 8/2011 Karasawa

* cited by examiner

SYSTEM AND METHOD FOR ROUTING AND SPECIFYING PRINT JOBS UTILIZING PRODUCT CHARACTERISTICS

CROSS-REFERENCE TO RELATED APPLICATIONS

This application is a continuation of U.S. patent application Ser. No. 13/628,741, filed Sep. 27, 2012, now U.S. Pat. No. 9,405,489, which claims the benefit of U.S. Provisional Application No. 61/540,393, filed Sep. 28, 2011, the contents of which are hereby incorporated by reference in their entirety.

FIELD OF THE INVENTION

The present invention is directed to a scoring/weighting methodology for routing print jobs to print queues, specifying print mediums on the basis of print product characteristics, and for determining if a given product can be produced by a given lab. A system and method are provided for determining and assigning a score/weighting to printer devices by evaluating the ability of said device to adequately, efficiently and cost effectively produce the printed material according to specified product characteristics, such as whether the printer has an appropriate type of paper loaded or available. The scoring process encompasses device evaluation, print medium availability and accessibility inquiries, as well as manipulation of the product and product specifications. The present invention provides automated decision making to the process of printing digital images or producing products.

BACKGROUND OF THE INVENTION

The production of image prints in varying sizes continues to enjoy a significant demand despite the various devices that are available today for people to electronically view and enjoy images. Coupled with that demand is the need for print product providers, not only to fulfill the requests and specifications of customers, but to also be able to do so to the satisfaction of the customer and in an efficient, cost effective manner.

To address this issue, a number of printing programs, devices and machines have evolved over the years. Many such solutions include a wide variety of printing capabilities, thus enabling customers to specify varying end product characteristics. Such characteristics might include print sizes, print finishes—glossy or non-glossy, and so on. Associated with such characteristics is the need for special purpose printing devices and special purpose or appropriately sized mediums, such as photo paper. As such, a photo-finisher may have multiple print devices, with each device having the ability to handle and/or internally stock varying print medium formats and sizes.

In order to fulfill a print request, it is necessary for the appropriate device and medium to be selected. In many situations, this process may include software programs that essentially make the appropriate selections for the operator. This option ensures that the proper medium and most efficient photo paper sizes, for example, are selected in order to maximize the number of photographs that can be generated for the customer specified size characteristic. A problem generally arises when, for example, the print device to which a product job has been sent, runs out of the appropriate sized paper (e.g., 6 inch or 8 inch paper), or the device is not capable of handling the characteristics associated with the particular product. In this situation, the operator, if available, must then reload the printer or reassign the print job. However, if the paper size is not immediately available to the operator or the operator is not physically present, the entire operations for that fulfillment center will come to a halt. This can be particularly problematic when dealing with a fulfillment center that is handling several hundreds of orders.

What is needed is an automatic methodology by which the delay can be totally abated, irrespective of the immediate availability of the "correct" sized paper, without operator intervention. Print jobs should be re-routable to other devices, and alternate paper selections should be possible in order to achieve the same end result, without product waste. Even further, means by which the most efficient, capable, and properly stocked print devices for a given product characteristic, could be selected at the onset would be highly advantageous.

Accordingly there is a need for an efficient, scalable, user friendly and robust technique for assigning jobs to print device queues based on the characteristics of the products involved in each of the jobs. The present invention fills these needs as well as other needs.

SUMMARY OF THE INVENTION

The present invention is directed to a scoring and weighting method for providing asynchronous print device selection on the basis of product characteristics that are specified for a print product. The method comprises determining in real time capabilities of one or more printing devices in connection with the product characteristics of a job, wherein the printing devices may have one or more print mediums for providing the print product. In another aspect, the present invention derives a score by determining a status respecting the conformity of the one or more print mediums to the product characteristics and evaluates the one or more printing devices' properties and the one or more print mediums' status. In a further aspect, the score is associated with each of the one or more printing devices. In yet another aspect, the print product is associated with a print job and the score is utilized to route the print job initially to one of the one or more printing devices to produce the print product on one of the one or more print mediums. Thereafter the job may be routed to another printing device or another medium within the initial printing device. The weighting may be overridden by an operator and is also impacted by operator input regarding the availability or not of a particular print medium.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the systems and methods described herein for providing and implementing a scoring scheme to thereby allocate product print jobs to devices in relation to the characteristic of the print product may be implemented in hardware, software or a combination thereof, and may be distributed across a variety of computing devices.

This document is organized as follows. In the first section, an overview of the techniques and implementation is provided and described with reference to some component devices and embodiment of the invention. In the next section, an exemplary algorithm for providing a base scoring aspect of the present invention is discussed. Following this, an example of providing additional scoring or further tuning of the base scoring is discussed. Next, an illustrative operational function of the present invention is presented and described. Finally, an exemplary computer environment for the implementation and use of the invention is described.

The present invention provides a system and method to enable a preview of a print product in order to determine among other things, the characteristics of the desired product, the level of difficulty required to achieve the end result, and the best suited device for delivering the product, given other external circumstance or situations relating to the product delivery device. A scheme of scoring production devices enables an optimization, matching and assignment of the best device, to produce required product.

The present invention is described with reference to equipment and processes relating to photography and more specifically, the production of photo related products by the printing of images onto paper to produce an image print, or on calendars, mugs, photo books, blankets, clothing, jewelry, mouse pads, puzzles, and the like, in the photo ordering and fulfillment process. However, as would be appreciated by one skilled in the art, the invention may be applicable to other processes and implementations, the references and discussion provided herein are strictly for illustrative purposes and are not intended to limit the scope of the invention. For example, the present invention would be applicable to fields in which one or more end-products have very specific characteristics and there is a need to decide among a variety of means for producing such products. Such fields may include tooling operations where end product characteristics may be fed to several CNC machines, or include other collections of rendering equipment which may be selectable to provide an output on the basis of best fit for a specified set of output product characteristics.

Figure 1:
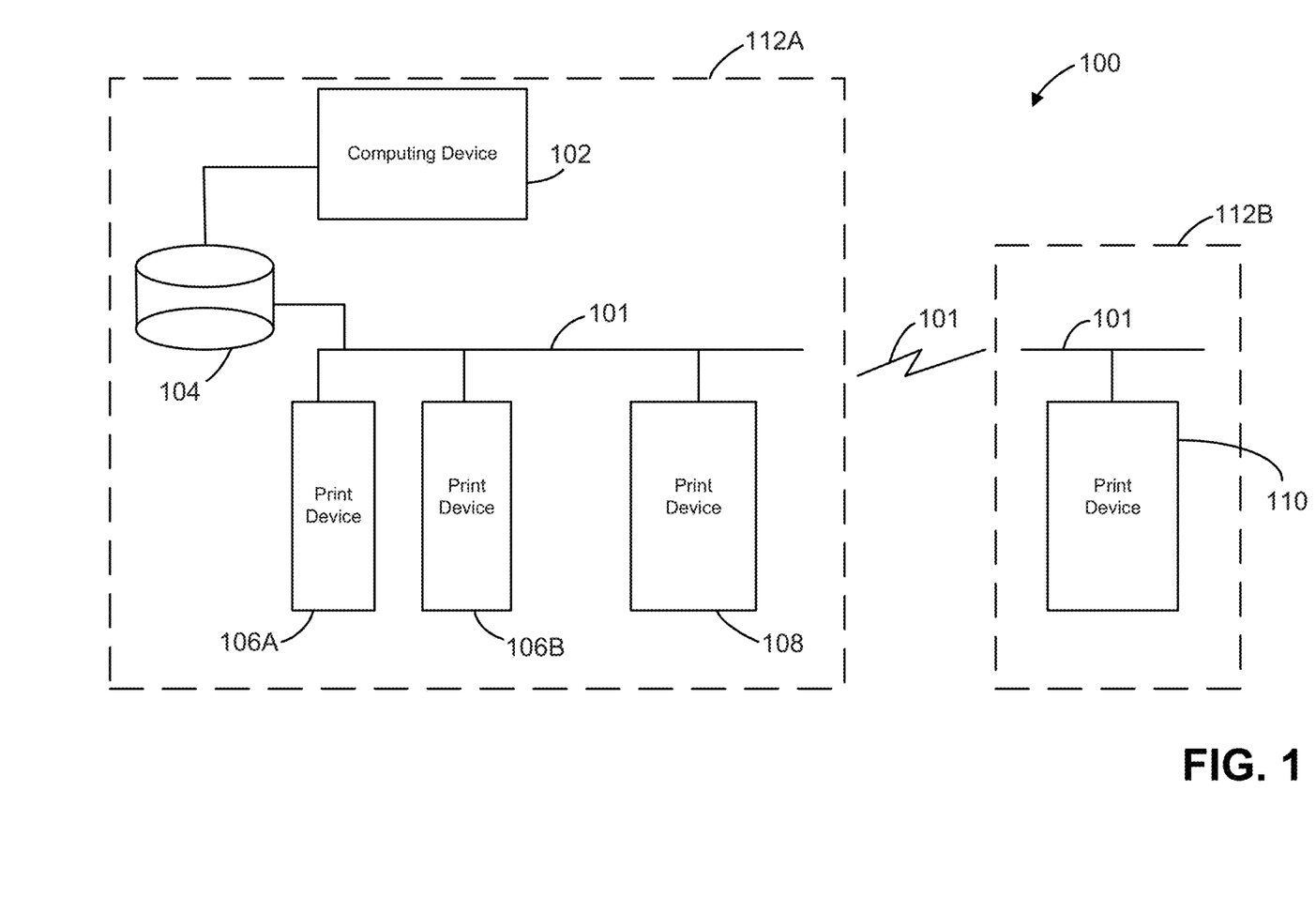
FIG. 1 is a block diagram generally illustrating various components that may be utilized for the implementation of some aspects of the present invention.

Referring to the drawings, and initially to FIG. 1, a print processing and fulfillment system is provided and is identified as reference number 100. In general, the system 100 is configured for providing prints of images according to criteria that may have been specified by a user of system 100, such as a customer. The system 100 may include a communication network 101, such as a Local Area Network (LAN), Wide Area Network (WAN), Wireless network or other similar configuration for allowing communication among two or more computing devices. Connected to the network 101 may be a personal computer 102 or other computing device that is configured to communicate with a server 104 and one or more image printing devices 106A, 106B, 108 and 110. Computing device 102 includes devices such as handheld devices, laptop computers or personal computers, which may be located in a home, office, retail location or other environment, and that provide an interface for user interaction with local or remote applications or systems. Computing device 102 may be a wireless device such as a cellular phone or personal digital assistant. A server 104 as used herein may be utilized to provide any one or more of a variety of functions including serving as a web server, data store, print spooler, print queue, an application server and/or provide other services. The printing devices 106A and 106B may be identical printers that handle specific product types, for example 4×6 and 5×7 photo prints. The duplication of equipment may be due to the fact that perhaps 4×6 prints are the most demanded product specifications or for whatever reason. A second printing device variety 108 is provided, which may be capable of handling 4×6, 8×10 and 16×20 prints. These devices may all be co-located with a first fulfillment center 112A. A second fulfillment center 112B may be remotely located and connected to the network 101. Each fulfillment center 112A, 112B, may have its own local area network and local server in addition to other devices for fulfilling user orders. Alternatively and as shown, fulfillment center 112B may just provide remote printing capabilities via printing device 110. As shown, the computer 102, data store 104 and printers 106A, 106B and 108 may all be located in one facility or at least in very close geographic proximity identified as reference number 112A. Printer 110 may be remotely located whereby it is accessible by a Wide Area Network, the internet or similar portion of the communication link 101, as identified by reference number 112B. Printer 110 may be configured to communicate with the computer 102 and server 104.

Customers place orders for photographic prints and specify any number of characteristics for each of the prints. A customer as used herein refers to one who originates an order for printed photographic images at a processing or fulfillment center 112A, 112B. The customer may utilize electronic means for delivery of the images or may physical deliver photographic film, in either case, the customer initiates a request/order for a finished product such as picture prints. With that order, the customer would specify print sizes, type of finish, etc.—product characteristics.

The fulfillment center 112A, 112B or order processor can be defined as the entity that acts upon the orders placed by the customer. The fulfillment center 112A, 112B may provide the end product to the customer either directly or through the partner provider. In this case, the focus is on print products and their characteristics, along with the capabilities of the printing devices 106A, 106B, 108 and 110 that are at the disposal of the fulfillment centers 112A and 112B. An appropriate printer, with the right capabilities speed, paper, etc. must be selected to perform the job and meet the customer's requirements.

Figure 2A:
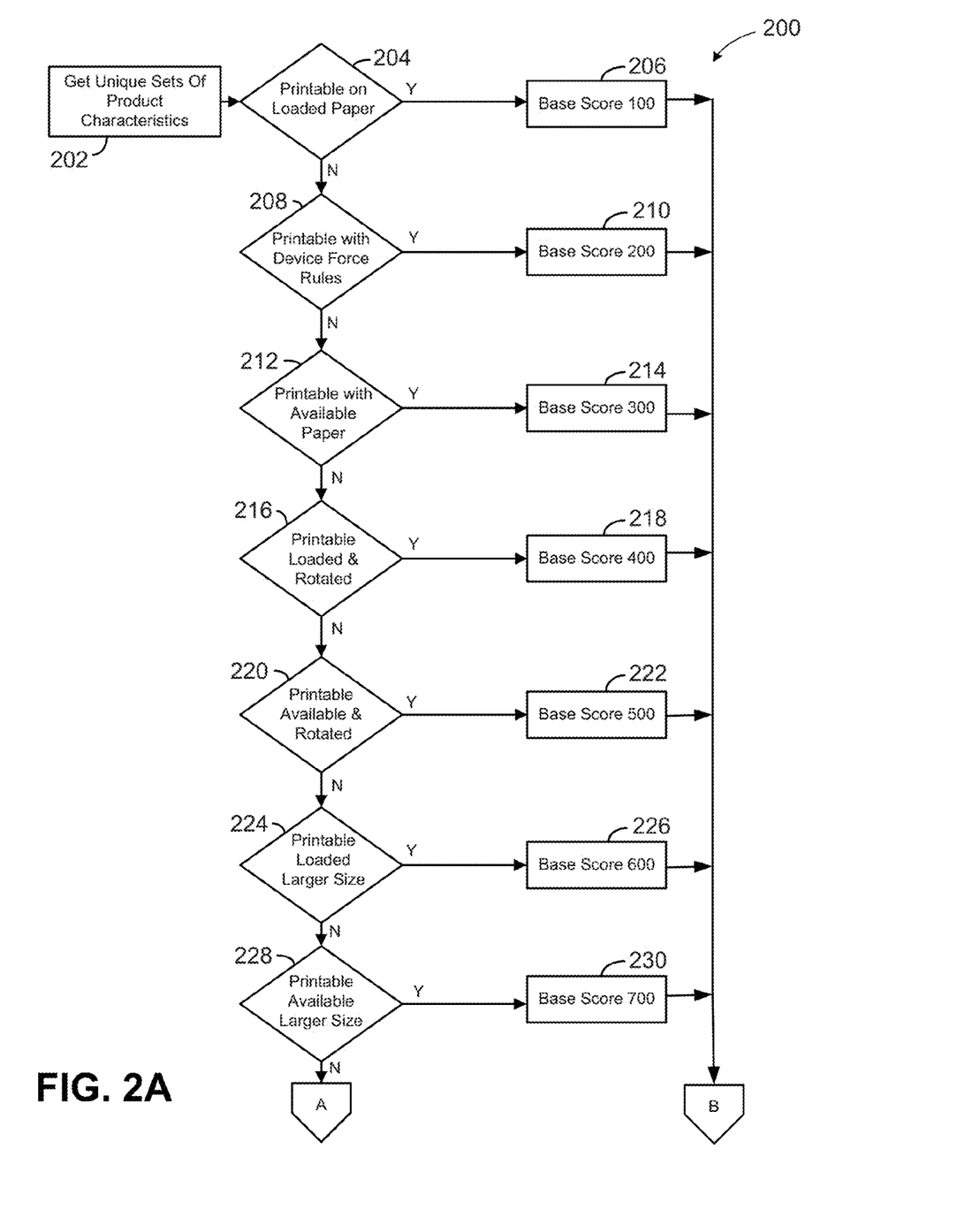
FIG. 2A is a flow chart illustrating a scoring methodology for providing a base score, which may be implemented in the present invention.
Figure 2B:
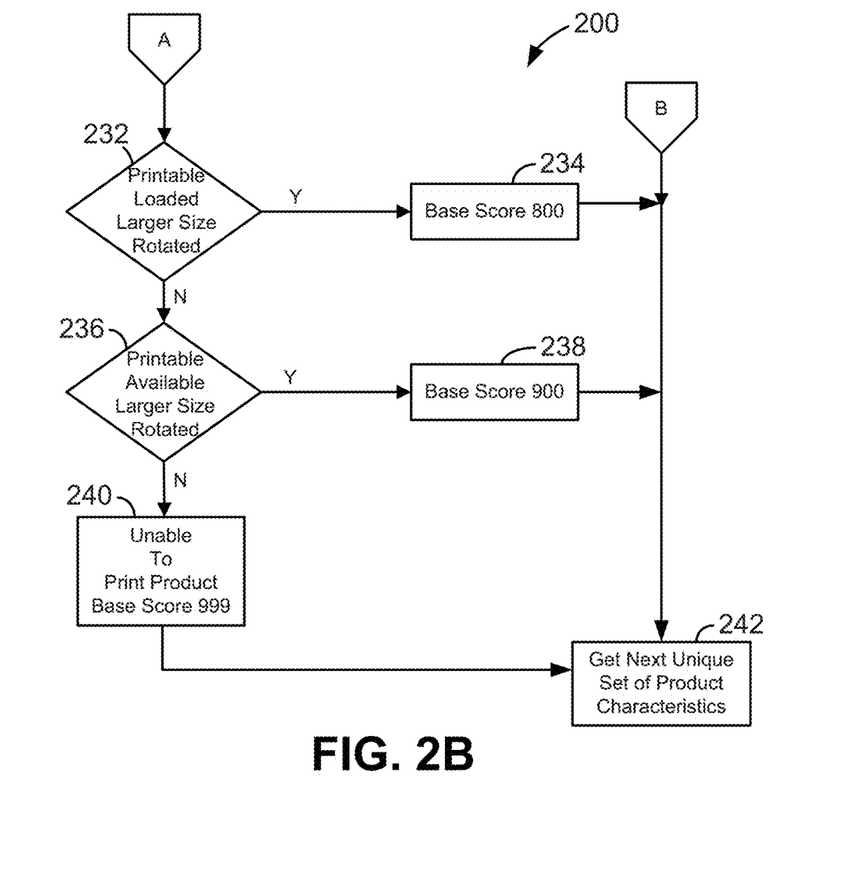
FIG. 2B is a continuation of the flow chart of FIG. 2A.

An aspect of the present invention relates to a scoring process and component whereby an appropriate printer device may be selected or be otherwise assigned. The advantages thereof can be further appreciated by considering the representative implementation of the scoring process illustrated in FIGS. 2A and 2B. With reference to FIGS. 2A and 2B, a logic flow diagram 200 for assigning a base score to the printing devices is illustrated. At step 202, the system 100 receives for printing, unique sets of product characteristics, i.e., customer orders with specific requirements. For example, the system may have received a request to print 4×6 photos and is first evaluating printer 106A for its suitability or readiness to perform the job order and thereby produce the product.

At step 204, the system will first determine the ability of printer 106A to produce the product with the unique set of product characteristics using the device's 106A currently loaded papers. In this example, 4×6 prints are set up by default to go onto 6 inch paper. Thus, a determination is made as to whether printer 106A has 4 inch or 6 inch rolls of paper loaded. If the result of that inquiry is in the affirmative, meaning that there is an appropriate roll to enable printing of 4×6 prints (i.e., 6 inch paper is loader in the printer), printer 106A will be assigned a score of 100 at step 206 and processing will resume at step 242 to consider the next unique set of product characteristics either for the same order set or for another order by a different customer. If on the other hand, 4 inch paper is loaded in the printer, a score of 400 would be attributed to the printer 106A. Orientation for printing is important because the number of prints per hour of a printer is higher for prints on 6 inch paper than for those same prints on 4 inch paper. Conversely, if here is no appropriate paper roll loaded, another inquiry ensues at step 208, where a determination is made about whether the product characteristics can be printed with the force output rule for printer 106A. So for example, say the characteristic that was specified by the customer is to print the new 4½×6 usually specified for digital cameras rather than 4×6. Since the printer 106 does not have that size paper (maybe it only has a 4 inch paper roll as opposed to the 6 inch paper roll), it may be possible to force the printer 106A to print the image onto the 4 inch roll paper. Returning to the flow diagram 200, if the determination of step 208 is true, (i.e., the printout can be forced), then printer 106A would be assigned a score of 200, at step 210, and processing will resume with step 242 for the next unique set of product characteristics. If print could not be forced then the system checks to see if the product characteristic can be printed with the currently available paper for the printer 106A. In other words, a determination is made as to whether a 6 inch roll, or whatever other size is specified, is available in the fulfillment center's stock room. If so, the printer is assigned a score of 300, at step 214, if 6 inch roll paper is available. The response to this inquiry may be provided by an end user or by querying a stock inventory system. Here after also, processing resumes with step 242. If the 6 inch roll is not available in stock, the system checks to see at step 216, if the product characteristics can be printed with other paper that is currently loaded in the printer 106A, if the job were to be rotated. So for example, a determination is made as to whether the job be printed on the 4 inch roll that is loaded, by rotating the images. If indeed 4 inch paper is loaded and it is possible to obtain the printout by rotating the job, the printer 106A is assigned a score of 400, at step 218 and processing exits to step 242. This inquiry and score assignment or processing of the next set of unique product characteristics at step 242, continues in a similar manner with different scores being assigned for different evaluations according to the following scheme:

Step 220, evaluate if there is paper available in stock that will allow printing if the job is rotated, and if so assign a score of 500 at step 222 (i.e., in the current example if only a 4 inch roll is available, a score of 500 applies);

Step 224, evaluate if characteristics can be printed with the device's currently loaded paper if the job is printed on a larger size (e.g., 5×7 paper that is loaded in printer 106), and if so assign a score of 600, at step 226. However, it should be noted that a product is not deemed producible by a store if the product would have to be printed on larger sized paper.

Step 228, evaluate if characteristics can be printed with stock available paper if the job is printed on a larger size, and if so assign a score of 700, at step 230;

Step 232, evaluate if characteristics can be printed with currently loaded larger size paper if the job is rotated, and if so assign a score of 800 at step 234; and Step 236, evaluate if characteristics can be printed with stock available larger sized paper if the job is rotated, and if so assign a score of 900 at step 238.

Invariably, if after processing steps 204 through 238, the response to each and every one of the inquiries is negative, the system will indicate at step 240 that the device is unable to print that particular unique set of product characteristics, and will then assign a score of 999. In other words, at this point, for example, it would be determined that printer 106A could not provide a printout for the criteria specified by the customer. Conversely, if a score is assigned for a characteristic that score is registered in the data store 104 for all matching entries of that product characteristic.

Processing would then continue for the same printer 106A for the next set of unique product characteristics, at step 242. This process is repeated for each printer device 106A, 106B, 108 and 110, thereby providing a score for each device in association with every set of unique product characteristics, for each product that has not yet been printed. It should be appreciated that the scoring scheme is variable and flexible, whereby any particular criteria or option may be weighted differently depending on what would achieve the best business or economic model for the fulfillment center. For example, in the illustrated and described scheme, it is preferable as indicated by the lower score number, to rotate a job at step 216 than it is to print the job on larger paper at step 224. This may not always be the desired outcome and the present invention thus allows a change to be made by merely reassigning different score values to each affected option.

In another aspect of the present invention, an operator can force a suitable score in order to allow a particular printer to become the chosen printer. In other words, the ability for a flexible override of the system operation in another aspect of the inventive system.

In a further aspect of the present invention, one or more supplemental values may also be added to or subtracted from the base score that was determined in the foregoing steps 204 to 240. This fine tuning or refining aspect of the invention is best described with reference to FIG. 3, wherein the logic flow 300 for evaluating if a print process may be interrupted is illustrated. Logic flow 300 is preferably initiated given a unique set of product characteristics and a base score as provided by flow 200. Processing begins at step 302 with an evaluation regarding whether a print device is busy and if the current job for which a printer is being sought, has been designated a high priority. If one or the other of these is not true (i.e., the device is not busy and/or the job is not a high priority), then processing will cease at step 303. In this case, the base score is entered into the data store 104. Conversely, if both inquiries are true, a further inquiry is made at step 304, to determine if the device supports interruption of a currently running batch of prints. If the device supports interruption of the current batch, a supplemental value of forty (40) is added to the base score at step 306. Alternatively, if the device does not support interruption of the currently executing batch, then a supplemental value of sixty (60) is added to the base score at step 308. At step 310, a list of items corresponding to the unique set of product characteristics is obtained, for example, from server 104. Then, for each item in the list with an entry for the currently evaluated device that is found in the database, the score and product characteristic in the data table are updated, at step 312, with the new or updated score value, i.e., base score plus 40 or 60 as the case may be. Finally, at step 314, for each item in the list that is without an entry in the database, for the currently evaluated printing device 106A, 106B, 108 and 110, the evaluated score and product characteristic are inserted into the item record.

Figure 3:
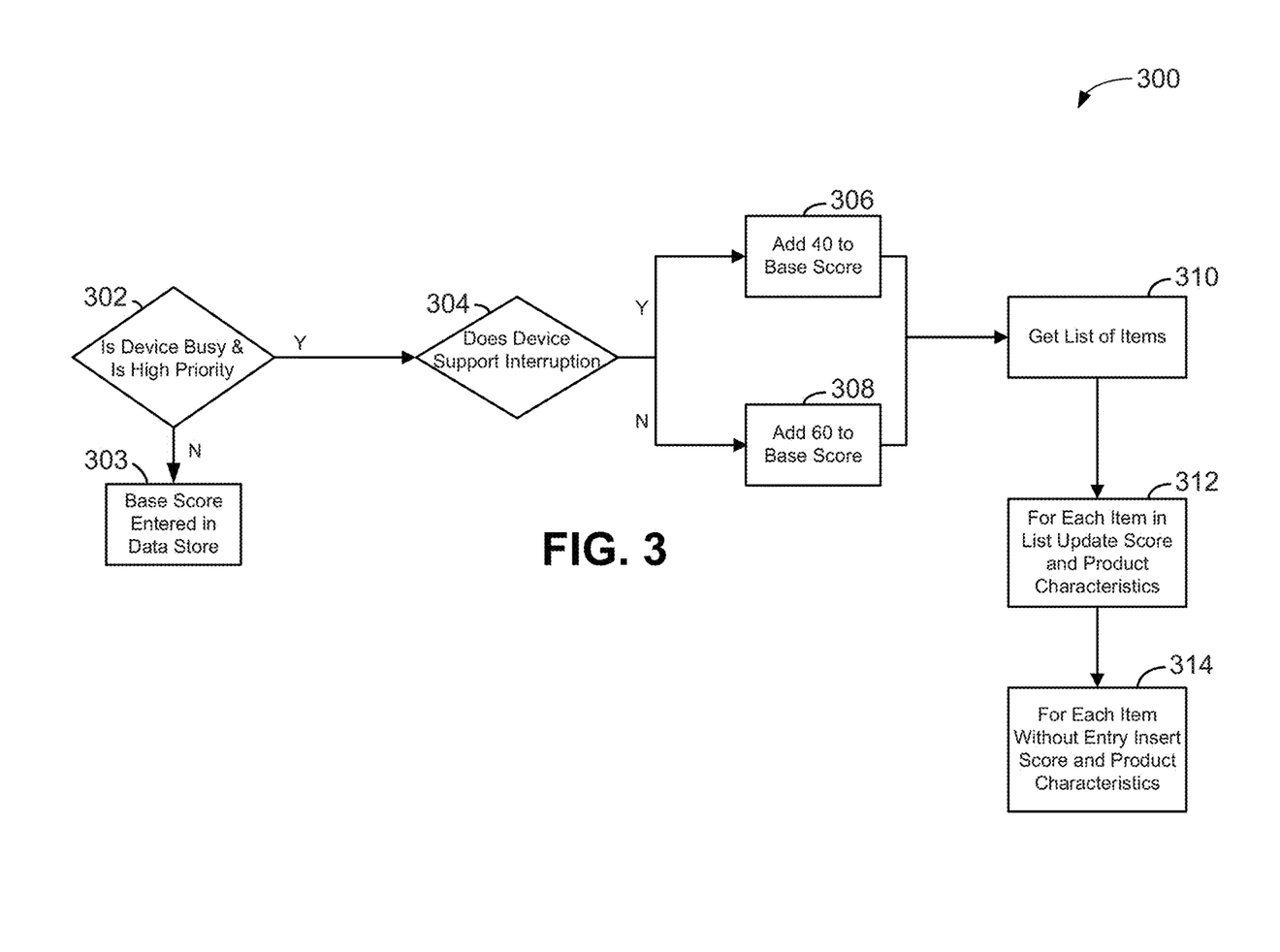
FIG. 3 is a flow chart illustrating a further aspect of the present invention wherein the scoring of FIGS. 2A and 2B are fine tuned by the introduction of additional scoring and finally the entry of the scores into a data store.

In a further aspect of the present invention, the score values are themselves utilized as keys to provide an indication of priority, above and beyond the contribution of the score to the total score that is derived for a printing device. More specifically and continuing with the previous example, consider a first device having a base score 500 that also supports interruption of the current batch, and a second device having a base score 300 that does not support interruption of the current batch. The first device will end up with a score of 540 and the second device will end up with a score of 360. In this aspect of the invention, the first device that has the key value 40 within its score, i.e. a four in the tenths position, will have a higher priority than the second device which has a 6 in the same position. This is despite the fact that the second device has an overall lower total score.

Figure 4:
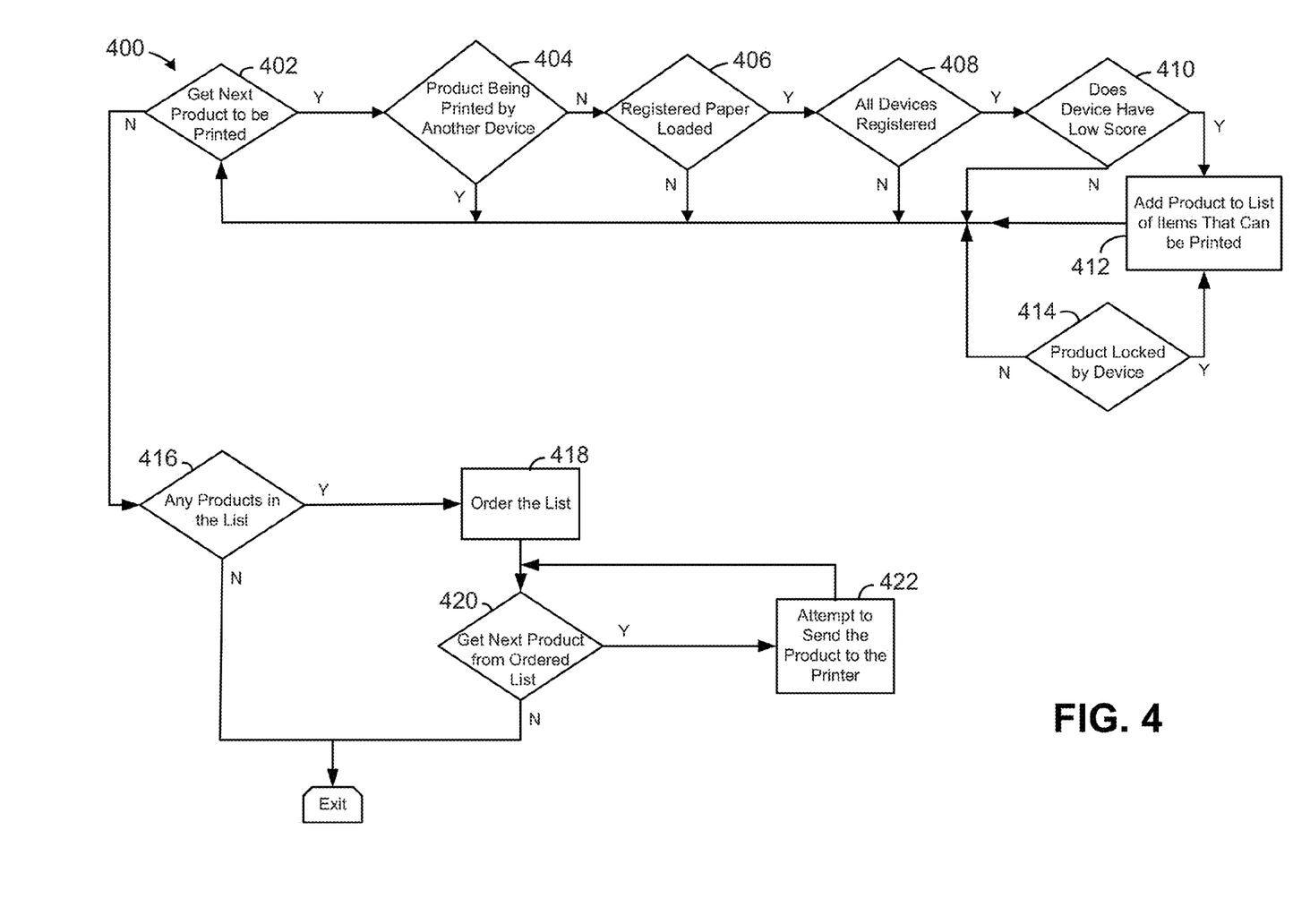
FIG. 4 is flow chart generally illustrating a procedure for printing utilizing the scoring methodology of the present invention.

In operation, and as more readily understood with reference to FIG. 4, the present invention utilizes the score value in the print sequence 400. The score process of flows 200, 300 and the print sequence 400 may occur and operate asynchronously. Even further, the print sequence logic 400 may be executing for multiple print devices 106A, 106B, 108 and 110 at the same time. Hence, one aspect of the present invention enables asynchronous, parallel processing of print jobs and queues, based on print product characteristics, and provide means to communicate among and between the asynchronous processes. The sequence 400 is performed for each device 106A, 106B, 108 and 110 within the system 100. At step 402, the next product in a product print list is obtained. If there is no product in the product print list, processing branches to step 416 to address the printer device's print list. If there is a product in the product print list, processing continues to step 404 where a determination is made about whether that particular product is already being printed by another device. This aspect supports the asynchronous processing of the present invention. If the product is being printed by another device, the program loops back to step 402 to look for the next product within the product print list. Conversely, if the product is not being printed by some print device, then an inquiry is made at step 406 to determine if the paper that is associated with the device's registration to print this job is currently loaded in the printer. If the paper is not loaded, processing exits and loops back to step 402. If the paper is loaded as determined at step 406, processing continues to step 408 to determine if all printer devices in the system 100 have registered for the particular product. Since not all evaluation of printer devices may have been completed at this instant, this verification is provided. If they have not, the process loops back again to step 402, for the next product in the product print list. Alternatively, at step 410, if the all the devices have registered, the system evaluates if the current print device actually has the lowest score for the particular product under consideration. If the current print device does have the lowest score, then the product is added at step 412 to a list of items that can be printed by the device 106A, 106B, 108 and 110 (i.e., the device print list), then processing loops back to step 402. However, if the current print device does not have the lowest score, a further evaluation is conducted at step 414 to see if the product is already locked by the current device. If the product is locked by the current device then processing shifts to step 412, where the product is added to the device's print list. Otherwise processing returns to step 402 to consider the next product in the product print list. As stated earlier, with each evaluation at step 402, if there are no other products in the product print list, processing moves to step 416 to handle the device's print list.

At step 416, if there are no items in the device print list, processing exits. Conversely, if there are devices in the list, the list is sorted at step 418. An attempt to obtain a product from the list takes place at step 420. If there is no product to obtain, then processing exits. However, if there is a product, an attempt is made to send the product to the printer device at step 422. Steps 420-422 repeat in a loop until there are no further products in the device print list. Alternatively, step 416 may be automatically triggered by the addition of products to a device's product list. Similarly, other aspects of the processes described herein may be programmed to respond to events as opposed to operating sequentially. The failure of a print device 106A, 106B, 108 and 110 to successfully produce a print product or completed a job order, for example in the cases of running out of paper, may trigger the initiating step 202 of the process flow 200 whereby another device would be designated to complete the job.

Having described the system and method of the present invention and an embodiment thereof, an exemplary computer environment for implementing the described design and execution is presented next.

Figure 5:
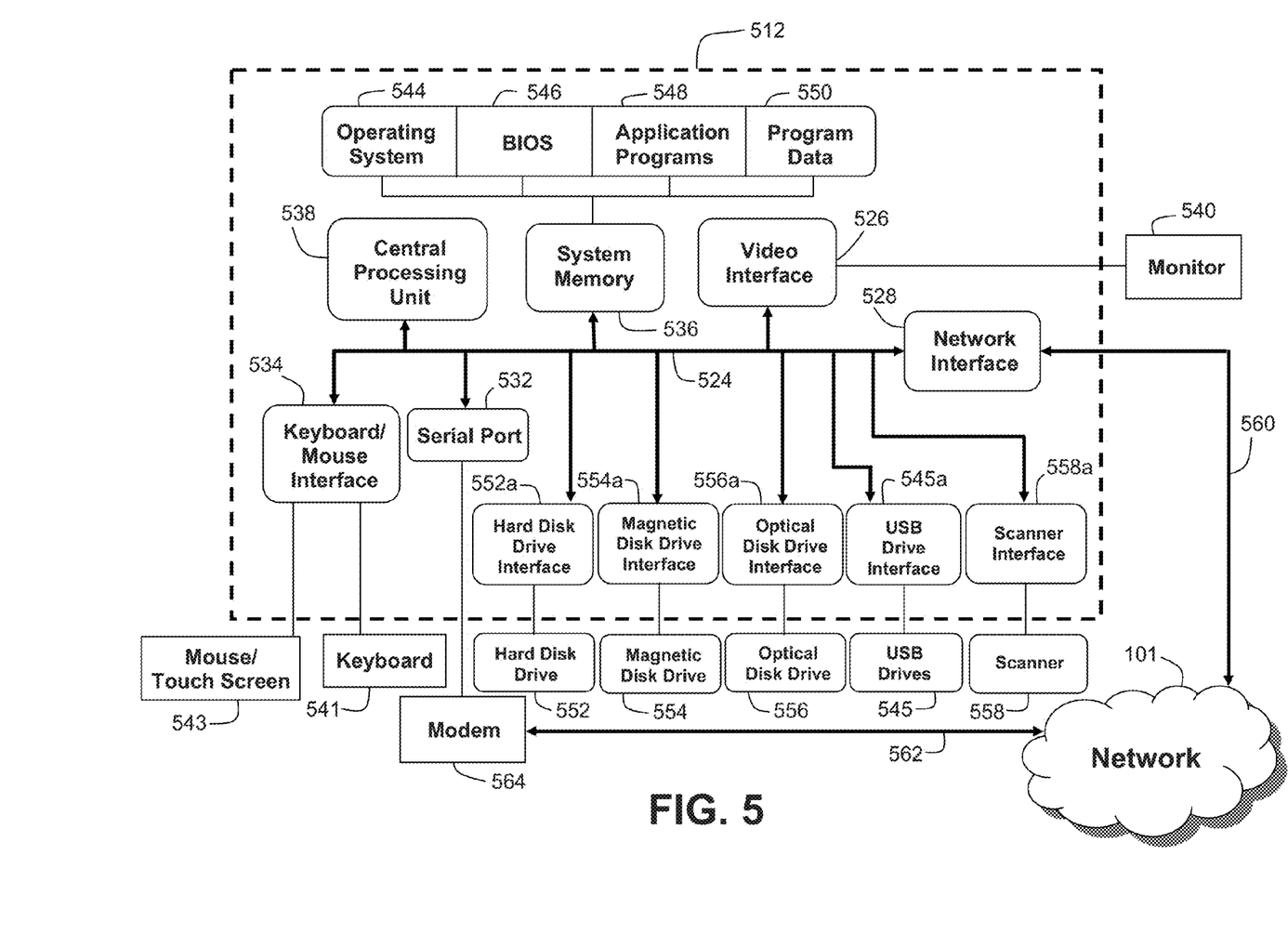
FIG. 5 is a block diagram generally illustrating a computing environment in which the invention may be implemented.

FIG. 5 shows an exemplary computing environment 500 that can be used to implement any of the processing thus far described. Computing environment 500 may include one or more computers 512 (such as computing device 102) comprising a system bus 524 that couples a video interface 526, network interface 528, a keyboard/mouse interface 534, and a system memory 536 to a Central Processing Unit (CPU) 538. A monitor or display 540 is connected to bus 524 by video interface 526 and provides the user with a graphical user interface to view, edit, and prepare a print order using digitally represented still images. The graphical user interface allows the user to enter commands and information into computer 512 using a keyboard 541 and a user interface selection device 543, such as a mouse, touch screen, or other pointing device. Keyboard 541 and user interface selection device are connected to bus 524 through keyboard/mouse interface 534. The display 540 and user interface selection device 543 are used in combination to form the graphical user interface which allows the user to implement at least a portion of the present invention. Other peripheral devices may be connected to the remote computer through universal serial bus (USB) drives 545 to transfer information to and from computer 512. For example, cameras and camcorders may be connected to computer 512 through serial port 532 or USB drives 545 so that data representative of a digitally represented still image or video may be downloaded to system memory 536 or another memory storage device associated with computer 512 such that the images may be subsequently printed by one or more fulfillment centers 112 in accordance with the present invention.

The system memory 536 is also connected to bus 524 and may include read only memory (ROM), random access memory (RAM), an operating system 544, a basic input/output system (BIOS) 546, application programs 548 and program data 550. The computer 512 may further include a hard disk drive 552 for reading from and writing to a hard disk, a magnetic disk drive 554 for reading from and writing to a removable magnetic disk (e.g., floppy disk), and an optical disk drive 556 for reading from and writing to a removable optical disk (e.g., CD ROM or other optical media). The computer 512 may also include USB drives 545 and other types of drives for reading from and writing to flash memory devices (e.g., compact flash, memory stick/PRO and DUO, SD card, multimedia card, smart media xD card), and a scanner 558 for scanning items such as still image photographs to be downloaded to computer 512. A hard disk drive interface 552*a*, magnetic disk drive interface 554*a*, an optical drive interface 556*a*, a USB drive interface 545*a*, and a scanner interface 558*a* operate to connect bus 524 to hard disk drive 552, magnetic disk drive 554, optical disk drive 556, USB drive 545 and scanner 558, respectively. Each of these drive components and their associated computer-readable media may provide remote computer 512 with non-volatile storage of computer-readable instruction, program modules, data structures, application programs, an operating system, and other data for computer 512. In addition, it will be understood that computer 512 may also utilize other types of computer-readable media in addition to those types set forth herein, such as digital video disks, random access memory, read only memory, other types of flash memory cards, magnetic cassettes, and the like.

Computer 512 may operate in a networked environment using logical connections with fulfillment centers 112A, 112B. Network interface 528 provides a communication path 560 between bus 524 and network 101, which allows, for example, a print order to be communicated through network 101 from photo service provider to fulfillment centers 112A, 112B after the print order has been established, and optionally saved in a memory. This type of logical network connection is commonly used in conjunction with a local area network (LAN). The print order may also be communicated from bus 524 through a communication path 562 to network 102 using serial port 532 and a modem 564. Using a modem connection between the computer 512 and fulfillment center 112A, 112B is commonly used in conjunction with a wide area network (WAN). It will be appreciated that the network connections shown herein are merely exemplary, and it is within the scope of the present invention to use other types of network connections between remote computer 512 and fulfillment centers 112A, 112B including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system for selecting an image printing device for producing a product based on two characteristics of the product selected by a user, the system comprising:
   one or more image printing devices;
   one or more print mediums for use in said one or more image printing devices;
   a user specification component;
   a server in communication with said user specification component and said one or more image printing devices; and
   a scoring component adapted to establish a base score value for each of said one or more image printing devices,
   wherein said one or more image printing devices is adapted to utilize at least one of said one or more print mediums for producing the product,
   wherein said user specification component is operable to enable the user to specify the two characteristics of the product that will be provided on said one or more print mediums, wherein a predetermined default print medium size is provided for the product based on the two characteristics,
   wherein said base score value for each of said one or more image printing devices is representative of the suitability of each of said one or more image printing devices to produce the product having the two characteristics of the product,
   wherein said scoring component establishes said base score value for each of said one or more image printing devices based at least in part on a comparison of said predetermined default print medium size with a size of said one or more print mediums in each of said one or more image printing devices,
   wherein said scoring component is adapted to either add or subtract one or more supplemental values to said base score value based on an additional criteria, wherein said additional criteria corresponds to whether each of said one or more image printing devices support interruption of the production of the product, and wherein the sum of said base score value and said one or more supplemental values is equal to an updated score, and
   wherein a portion of said updated score value is utilized by said server to select an appropriate one of said one or more image printing devices to produce the product using one of said one or more print mediums.

2. A system in accordance with claim 1, wherein a selection of said appropriate one of said one or more image printing devices to produce the product is based on said one or more image printing devices having the lowest said base score value.

3. A system in accordance with claim 1, wherein the product is selected from the group consisting of an image print, calendar, mug, photo book, blanket, clothing, jewelry, mouse pad, and puzzle.

4. A system in accordance with claim 3, wherein the product is an image print, and wherein one of said two characteristics of the product is a print size for said image print.

5. A system in accordance with claim 3, wherein the product is an image print, wherein said two characteristics of the image print include a print size and an orientation, wherein said predetermined default print medium size is provided for said image print based on said print size and said orientation, and wherein said scoring component establishes a first base score value when said predetermined default print medium size of the image print matches said size of said one or more print mediums loaded in said one or more image printing devices.

6. A system in accordance with claim 3, wherein the product is an image print, and wherein an additional characteristic of the product is a print finish of said image print.

7. A system in accordance with claim 5, wherein said print size includes a length and a width, wherein said scoring component establishes a second base score value when said length and said width of the image print are both different than said size of said one or more print mediums loaded in said one or more image printing devices, and when said one or more image printing devices are configured for producing the image print using one of said one or more print mediums loaded in said one or more image printing devices, and wherein said second base score value is different than said first base score value.

8. A system in accordance with claim 5, wherein said size of said one or more print mediums is a width of said one or more print mediums.

9. A system in accordance with claim 7, wherein said scoring component establishes a third base score value when said one or more print mediums having the same size as said predetermined default print medium size of the image print are not loaded in said one or more image printing devices, and when said one or more print mediums having the same size as said predetermined default print medium size of the image print is available to be loaded in said one or more image printing devices, and wherein said third base score value is different than said first and second base score values.

10. A system in accordance with claim 9, wherein said scoring component establishes a fourth base score value when one of said length and said width of the image print matches said size of said one or more print mediums loaded in said one or more image printing devices, and when said predetermined default print medium size of the image print does not match said size of said one or more print mediums loaded in said one or more image printing devices, and wherein said fourth base score value is different than said first, second, and third base score values.

11. A system in accordance with claim 10, wherein said scoring component establishes a fifth base score value when said one or more print mediums having the same size as said predetermined default print medium size of the image print are not loaded in said one or more image printing devices, and when said one or more print mediums are available to be loaded in said one or more image printing devices where one of said length and said width of the image print matches said size of said available one or more print mediums and said predetermined default print medium size of the image print does not match said size of said available one or more print mediums, and wherein said fifth base score value is different than said first, second, third and fourth base score values.

12. A system in accordance with claim 11, wherein said scoring component establishes a sixth base score value when said predetermined default print medium size of the image print is smaller than said size of said one or more print mediums loaded in said one or more image printing devices, and wherein said sixth base score value is different than said first, second, third, fourth and fifth base score values.

13. A system in accordance with claim 12, wherein said scoring component establishes a seventh base score value when said one or more print mediums having the same size as said predetermined default print medium size of the image print are not loaded in said one or more image printing devices, and when said one or more print mediums having a larger size than said predetermined default print medium size are available to be loaded in said one or more image printing devices, and wherein said seventh base score value is different than said first, second, third, fourth, fifth and sixth base score values.

14. A system in accordance with claim 13, wherein said scoring component establishes an eighth base score value when said size of said one or more print mediums loaded in said one or more image printing devices is greater than said length and said width of the image print, and when said orientation of the image print is changed, and wherein said eighth base score value is different than said first, second, third, fourth, fifth, sixth, and seventh base score values.

15. A system in accordance with claim 14, wherein said scoring component establishes a ninth base score value when said one or more print mediums having the same size as said predetermined default print medium size of the image print is not loaded in said one or more image printing devices, when said one or more print mediums having a size that is greater than said length and said width of the image print are available to be loaded in said one or more image printing devices, and when said orientation of the image print is changed, and wherein said ninth base score value is different than said first, second, third, fourth, fifth, sixth, seventh, and eighth base score values.

16. A system in accordance with claim 15, wherein said first, second, third, fourth, fifth, sixth, seventh, eighth, and ninth base score values, respectively, increase or decrease in sequential order.

17. A system in accordance with claim 1, wherein said one or more print mediums are one or more rolls of print paper, wherein each of said one or more rolls of print paper have different sizes.

18. A system in accordance with claim 17, wherein said scoring component establishes said base score value based at least in part on a comparison of said predetermined default print medium size and the size of each of said one or more rolls of print paper that are available in each of said one or more image printing devices.

19. A system in accordance with claim 1, wherein said size of said one or more print mediums is a width of said one or more print mediums.

20. A scoring and weighting method for selecting one or more image printing devices for producing a print product using one or more print mediums, the method comprising:
identifying two characteristics for the print product, wherein a predetermined default print medium size is provided for the print product based on said identified two characteristics;
determining a size of said one or more print mediums that are available in each of said one or more image printing devices;
establishing a base score value for each one of the one or more image printing devices based at least in part on a comparison of said predetermined default print medium size with said size of said one or more print mediums that are available in said one or more image printing devices to produce the print product;

adding or subtracting a supplemental value to said base score value based on an additional criterion, wherein said additional criterion corresponds to whether said respective one or more image printing devices support interruption of the production of the print product, and wherein a sum of said base score value and said supplemental value is equal to an updated score; associating the print product with a print job; and utilizing said updated score value by a server so as to route and prioritize said print job to one of said one or more image printing devices to produce the print product using one of said one or more print mediums.

21. A method in accordance with claim 20, wherein said one or more image printing devices with the lowest base score value is used to produce the print product.

22. A method in accordance with claim 20, wherein the print product is selected from the group consisting of an image print, calendar, mug, photo book, blanket, clothing, jewelry, mouse pad, and puzzle.

23. A method in accordance with claim 22, wherein the print product is an image print, and wherein one of said two characteristics of the print product is a print size for said image print.

24. A method in accordance with claim 22, wherein the print product is an image print, and wherein one of said two characteristics of the print product is a print finish of said image print.

25. A method in accordance with claim 20, further comprising allowing a customer to select said two characteristics for the print product.

26. A method in accordance with claim 20, wherein the print product is an image print, and wherein said two characteristics of the print product is a print size and orientation of said image print.

27. A method in accordance with claim 20, wherein the method includes utilizing a portion of said updated score value by said server to route and prioritize said print job to one of said one or more image printing devices to produce the print product using one of said one or more print mediums.

28. A method in accordance with claim 20, wherein said size of said one or more print mediums is a width of said one or more print mediums.

29. A system for selecting an image printing device for producing an image print based on two characteristics of the image print selected by a user, the image print including a length and a width, the system comprising:

one or more image printing devices;
one or more print mediums for use in said one or more image printing devices;
a user specification component;
a server in communication with said user specification component and said one or more image printing devices; and
a scoring component adapted to establish a score value for each of said one or more image printing devices,
wherein said one or more image printing devices is adapted to utilize at least one of said one or more print mediums for producing the image print,
wherein said user specification component is operable to enable the user to specify the two characteristics of the image print that will be provided on said one or more print mediums, wherein the two characteristics of the image print include a print size and an orientation, and wherein a predetermined default print medium size is provided for the image print based on said print size and said orientation,
wherein said score value for each of said one or more image printing devices is representative of the suitability of each of said one or more image printing devices to produce the image print having the two characteristics of the image print,
wherein said scoring component establishes said score value for each of said one or more image printing devices based at least in part on a comparison of said predetermined default print medium size with a size of said one or more print mediums in each of said one or more image printing devices,
wherein said score value is utilized by said server to select an appropriate one of said one or more image printing devices to produce the image print using one of said one or more print mediums,
wherein said scoring component establishes a first score value when said predetermined default print medium size of the image print matches said size of said one or more print mediums loaded in said one or more image printing devices,
wherein said scoring component establishes a second score value when said length and said width of the image print are both different than said size of said one or more print mediums loaded in said one or more image printing devices, and when said one or more image printing devices are configured for producing the image print using one of said one or more print mediums loaded in said one or more image printing devices, and
wherein said second score value is different than said first score value.

30. A system in accordance with claim 29, wherein a selection of said appropriate one of said one or more image printing devices to produce the image print is based on said one or more image printing devices having the lowest said score value.

31. A system for selecting an image printing device for producing a product based on two characteristics of the product selected by a user, the product including a length and a width, the system comprising:

one or more image printing devices;
one or more print mediums for use in said one or more image printing devices;
a user specification component;
a server in communication with said user specification component and said one or more image printing devices; and
a scoring component adapted to establish a score value for each of said one or more image printing devices,
wherein said one or more image printing devices is adapted to utilize at least one of said one or more print mediums for producing the product,
wherein said user specification component is operable to enable the user to specify the two characteristics of the product that will be provided on said one or more print mediums, wherein the two characteristics of the product include a print size and an orientation, and wherein a predetermined default print medium size is provided for the product based on said print size and said orientation,
wherein said score value for each of said one or more image printing devices is representative of the suitability of each of said one or more image printing devices to produce the product having the two characteristics of the product,
wherein said scoring component establishes said score value for each of said one or more image printing devices based at least in part on a comparison of said predetermined default print medium size with a size of said one or more print mediums in each of said one or more image printing devices, wherein said score value is utilized by said server to select an appropriate one of said one or more image printing devices to produce the product using one of said one or more print mediums, wherein said scoring component establishes a first score value when said predetermined default print medium size of the product matches said size of said one or more print mediums loaded in said one or more image printing devices, wherein said scoring component establishes a second score value when said length and said width of the product are both different than said size of said one or more print mediums loaded in said one or more image printing devices, and when said one or more image printing devices are configured for producing the product using one of said one or more print mediums loaded in said one or more image printing devices, and wherein said second score value is different than said first score value.

32. A system in accordance with claim 31, wherein a selection of said appropriate one of said one or more image printing devices to produce the product is based on said one or more image printing devices having the lowest said score value.

33. A system for selecting an image printing device for producing a product based on two characteristics of the product selected by a user, the system comprising:
one or more image printing devices;
one or more print mediums for use in said one or more image printing devices;
a user specification component;
a server in communication with said user specification component and said one or more image printing devices; and
a scoring component adapted to establish a base score value for each of said one or more image printing devices, wherein said one or more image printing devices is adapted to utilize at least one of said one or more print mediums for producing the product, wherein said user specification component is operable to enable the user to specify the two characteristics of the product that will be provided on said one or more print mediums, wherein a predetermined default print medium size is provided for the product based on the two characteristics, wherein said base score value for each of said one or more image printing devices is representative of the suitability of each of said one or more image printing devices to produce the product having the two characteristics of the product, wherein said scoring component establishes said base score value for each of said one or more image printing devices based at least in part on a comparison of said predetermined default print medium size with a size of said one or more print mediums in each of said one or more image printing devices, wherein said scoring component is adapted to either add or subtract one or more supplemental values to said base score value based on an additional criteria, wherein said additional criteria corresponds to whether each of said one or more image printing devices support interruption of the production of the product, and wherein the sum of said base score value and said one or more supplemental values is equal to an updated score, and wherein said updated score value is utilized by said server to select an appropriate one of said one or more image printing devices to produce the product using one of said one or more print mediums.

* * * * *